(12) United States Patent
Phan et al.

(10) Patent No.: US 6,420,479 B1
(45) Date of Patent: Jul. 16, 2002

(54) STAR POLYMER COLLOIDAL STABILIZERS

(75) Inventors: Lein Phan, Mississauga; Rajeev Farwaha, Brampton, both of (CA); Apala Mukherjee, South Orange; John S. Thomaides, Berkeley Heights, both of NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/752,897

(22) Filed: Dec. 29, 2000

(51) Int. Cl.$^7$ .............................................. C08L 43/04
(52) U.S. Cl. ...................... 524/800; 524/501; 524/506; 524/804; 524/806; 526/279; 528/25; 528/26
(58) Field of Search .................. 524/501, 506, 524/800, 804; 526/279; 528/25, 26, 32

(56) References Cited

U.S. PATENT DOCUMENTS

| 5,274,064 A | 12/1993 | Sarkar | 528/25 |
| 5,473,048 A | 12/1995 | Sarkar | 528/376 |
| 5,605,952 A | 2/1997 | Esser | 524/522 |
| 5,856,392 A | * 1/1999 | Kennedy et al. | |
| 6,087,412 A | * 7/2000 | Chabracek et al. | |
| 6,150,468 A | * 11/2000 | Schoenberg et al. | |

FOREIGN PATENT DOCUMENTS

| WO | WO 97/15624 | 1/1997 | ........... C08L/43/04 |

* cited by examiner

*Primary Examiner*—Robert Dawson
*Assistant Examiner*—Marc S Zimmer
(74) *Attorney, Agent, or Firm*—Thomas F. Roland, Esq.

(57) ABSTRACT

A colloid composition is presented which contains an amphiphilic star polymer having potentially crosslinkable sites on the polymer backbone. The potentially crosslinkable site is either a sterically hindered silane monomer or an acetoacetoxy-containing monomer. When the crosslinkable site is a sterically hindered silane monomer the star polymer also contains an internal catalyst, and when the crosslinkable site is an acetoacetoxy group the colliod composition also contains a non-polymeric polyfunctional amine. The star polymer can be either a random or heteroarm star polymer. The colloid composition is useful in the formation and stabilization of emulsion polymers, as a replacement for surfactants currently used for this purpose. Emulsion polymers formulated with the colloid composition are especially useful for one-part coatings such as paints and adhesives.

17 Claims, No Drawings

STAR POLYMER COLLOIDAL STABILIZERS

FIELD OF THE INVENTION

This invention relates to a star polymer reactive colloidal composition, and to one part coating compositions containing the colloidal composition. The star polymer has latent cross-linkable functionality. Coating compositions containing the colloidal composition have improved mechanical properties, film strength, block resistance, wet adhesion, and abrasion resistance.

BACKGROUND OF THE INVENTION

Surface active agents, or surfactants are used to provide stability for emulsion polymer particles. These emulsions can then be used in the production of emulsion coatings. A problem with coatings produced with surfactants is that over time, the surfactants can migrate to the surface of the coating, producing detrimental effects on the surface properties. These detrimental effects are especially negative in mechanical properties related to hardness.

U.S. Pat. No. 5,605,952 describes a coating composition comprising polymers having acetoxy functionality and polymers having acid functionality, which can form a stable enamine structure by reacting with an amine. These polymers, however, produce a linear polymeric structure. An advantage of star polymers is that they have a lower viscosity than linear polymers.

U.S. Pat. No. 5,274,064 describes star polymers with reactive functional groups. The star polymers disclosed are backbone polymers to which alkoxy Si groups are attached as side chains. Such side chains are not highly sterically hindered, and therefore can react prematurely to form crosslinks prior to film formation, causing coagulum problems during manufacture and storage, or producing surface crosslinking between emulsion particles, rather than stronger crosslinking formed after particle coalescence. The radial star polymers described are the sole constituent of a coating composition, rather than an emulsifier useful in producing a coating composition.

U.S. patent application Ser. No. 09/227,756 describes coating compositions prepared with a sterically hindered alkoxylated silane. These coating compositions are formed from linear polymers, and lack a controlled architecture.

U.S. patent application Ser. No. 09/190,527 describes the use of amphiphilic heteroarm star polymers as emulsion stabilizers in emulsion polymerization.

A useful one-part reactive coating composition should be stable. It should not react during the polymerization process, during storage, nor during the liquid coating stage. Surprisingly, it has been found that star polymer colloids of the present invention, having potentially cross-linkable groups on the polymer backbone fulfill these requirements, providing excellent stability and also physical coating properties when used as stabilizers in emulsions used as part of a coating composition.

SUMMARY OF THE INVENTION

The present invention provides a colloid composition comprising an amphiphilic star polymer having potentially crosslinkable sites on the polymer backbone consisting of either a sterically hindered silane monomer and an internal catalyst, or an acetoacetoxy group and at least one non-polymeric polyfunctional amine.

The present invention also provides a means of producing an emulsion polymer using the novel colloidal composition of the invention as a replacement for surfactants for stabilization.

Further, the present invention provides a one-part coating composition comprising a radial or star polymer having cross-linkable functionality and an emulsion polymer.

While not being bound by any particular theory, it is believed that the colloids of the present invention react primarily after coalescence has occurred, due to the high level of steric hindrance provided. Because the reactive groups on the star-polymer colloid are so hindered, a reaction occurs only after the reactive groups are forced into very close proximity—a condition which occurs after coalescence of the emulsion particles. This mechanism is different than the prior art having polymer reactive groups which form surface cross-links between adjacent polymer chains, providing a weak bond and weak coating film. Ideally the colloids of the present invention migrate into and intermingle with other polymer chains, prior to the formation of crosslinks. The result is a much stronger, more cohesive bond and water resistant film.

DESCRIPTION OF THE INVENTION

The protective colloid composition of the present invention is an amphiphilic star polymer containing potentially crosslinkable sites on the polymer backbone. As used herein the term amphiphilic star polymer refers to a polymer having both hydrophilic and hydrophobic components.

Star or radial polymers, as used herein, is intended to describe polymers that have three or more polymeric arms emanating from a central core. These polymers can be prepared by various polymerization procedures such as anionic, cationic, and free radical mechanisms. The star polymers are usually formed by using either multifunctional initiators, multifunctional chain transfer agents, or multifunctional coupling agents. The star polymers have unique properties including low viscosities in solution due to their compact structure, and high melt viscosities due to extensive entanglements relative to their linear coatings.

Preferably, star polymers of the present invention comprise a polyvalent mercaptan core and three or more polymeric arms which extend radially from the core.

Preferably the core is a residue of a tri- to octafunctional thiol, and most preferably a residue of a tri-, tetra-, or hexafunctional thiol. The arms of the radial or star polymer may be of several types, including random or block copolymers, or homopolymers. The arms may be of the same or different compositions. A preferred composition is one in which the all of the arms are essentially the same. Other preferred star polymers are those which are heteroarm star polymers.

Said heteroarm star polymer has at least one arm with a Tg of at least 20° C. for a stable emulsion, preferably at least 25° C. and most preferably at least 50° C. If all arms of the star polymer are essentially the same, the Tg of the arms is at least 20° C. or greater.

Preferably, the arms of the star polymer contain 5–20% by weight of an anionic monomer such as methacrylic acid and 1 to 50% by weight of a cross linking functionality, based on the star polymer.

The star polymer useful in the present invention has a number average molecular weight of from 10,000 to 100,000; preferably 15,000 to 75,000; more preferably 30,000 to 75,000; and most preferably 30,000 to 50,000, based on a theoretical molecular weight calculated as $$Mw = (\text{grams of monomer/moles of chain transfer agent}) * n,$$

where n equals the number of arm on the star polymer.

Potentially crosslinkable sites, as understood herein, relates to functional groups which can react to form crosslinks, primarily during film formation after the onset of coalescence. Examples of potentially crosslinkable systems useful in the invention include, but are not limited to, chemical crosslinking, ionic crosslinking, and oxidative crosslinking.

Chemical crosslinking of the amphiphilic star polymer can result from several co-reactive groups, including but not limited to, sterically hindered silane, and acetoacetoxy functional chemistries. Other means of crosslinking include ionic crosslinking, such as a post-addition of a zinc ammonium complex to the latex; and oxidative crosslinking, as with dicyclopentenyl acrylate and castor acrylated monomer.

A star polymer having sterically hindered silane, is the reaction product of a residue of a tri-to-octafunctional thiol, an ethylenically unsaturated non-carboxy functional monomer, from 1 to 20 and preferably 2 to 10 parts per hundred monomer (pphm) of a sterically hindered alkoxylated silane monomer, optionally from 0.1 to 5 pphm of an ethylenically unsaturated carboxy-functional monomer, optionally from 0.1 to 5 pphm of a wet adhesion promoter such as an ureido-functional monomer, and an anionic surfactant. The sterically hindered alkoxylated silane is incorporated in the backbone of the polymer. The steric hindrance of the alkoxylated silane minimizes hydrolysis of the alkoxylated group during polymerization and storage.

While not wishing to be bound by any particular theory, the present inventors believe that crosslinking occurs between the sterically hindered alkoxysilane functionality on the polymer by means of a hydrolysis reaction to give silanols with subsequent condensation reaction between silanols and/or carboxyl groups on the polymer. Such crosslinking occurs during film formation, most probably after particle coalescence or drying of the coating. The advantage of preparing the coating composition with sterically hindered alkoxylated silane monomers is that crosslinking during the emulsion polymerization of the polymer and storage of the coating, especially in the presence of carboxyl groups, is minimized.

The sterically hindered alkoxylated silane monomer has the structure:

$$R^1-Si-(OR^2)_n(R^3)_{3-n}$$

wherein $R^1$ is selected from the group consisting of an alkylene, arylene, and aralkylene group; $R^2$ is independently a sterically hindered alkyl group having 3 to 10 carbon atoms in a straight or branched chain configuration; $R^3$ is a monovalent alkyl group having 1 to 10 carbon atoms; and n is an integer of from 1 to 3.

Suitable sterically hindered alkoxytated sllane monomers for use In the ooating compositions of the invention are vinyltrisopropoxy silane, vinyltriisobutoxy silane, vlnylpropylmethyipentoxy silane, vinylpropyidi-sec-butoxysilane. The sterically hindered alkoxylated silane monomer is preferably vinyltriisopropoxy silane.

Commonly used silanes, such as vinyl trimethoxysilane, vinyl trimethoxy silane, or methoxy diethoxy vinyl silane would not constitute a sterically hindered silane, and would react too quickly, creating premature crosslinks.

Star polymer colloids having a sterically hindered silane require an internal catalyst to provide crosslinking. An internal catalyst is one which is part of the polymer backbone, and serves as a catalyst in the formation of crosslinks with the silane functionality. An example of an internal catalyst would include, but not be limited to, an ethylenically unsaturated carboxy-functional monomer.

The internal catalyst is used in an amount of from about 0.1 to about 10 pphm, preferably from about 0.5 to about 2 pphm. An external catalyst, such as zinc or aluminum ions could additionally be present.

Suitable ethylenically unsaturated carboxy-functional monomers are α, β-ethylenically unsaturated $C_3-C_8$ monocarboxylic acids, α, β-ethylenically unsaturated $C_4-C_8$ dicarboxylic acids, including the anhydrides thereof, and the $C_4-C_8$ alkyl half esters of the α, β-ethylenically unsaturated $C_4-C_8$ dicarboxylic acids. Preferred ethylenically unsaturated carboxy-functional monomers are acrylic acid, methacrylic acid, and the $C_4-C_8$ alkyl half esters of maleic acid, maleic anhydride, fumaric acid, carboxyethylacrylate, and itaconic acid. Most preferably, the ethylenically unsaturated carboxy-functional monomer is acrylic acid or methacrylic acid. A combination of ethylenically unsaturated carboxy-functional monomers may also be used to prepare the star polymer.

Acetoacetoxy functional chemistries can also be used on the star-polymer backbone as the potentially crosslinkable sites. Acetoacetoxy functional chemistries useful in the present invention are monomers having the ability to form stable enamine structures by reacting with amines. The acetoacetoxy functionality can be added to the star polymer backbone by ethylenically-unsaturated acetoacetoxy monomers including, but not limited to acetoacetoxyethyl methacrylate (AAEM), acetoacetoxy ethyl acrylate, acrylamidomethylacetylacetone acetoacetoxybutyl methacrylate, allyl acetoacetate, vinyl acetoacetate and combinations thereof.

Crosslinking of a star polymer containing an acetoxyfunctioanl moiety such as AAEM or enamine requires reaction with a non-polymeric polyfunctional amine. The polyfunctional amine is a separate post-add to the colloid composition, or to an emulsion polymer containing said colloid composition. A polyfunctional amine is one containing at least two amine-functional moieties. Polyfunctional amines include, but are not limited to, aliphatic and cycloaliphatic amines having 2 to 10 primary and/or secondary amino groups and 2 to 100 carbon atoms. Examples of useful polyfunctional amines include hexamethylene diamine, 2-methyl pentamethylene diamine, 1,3-diamino pentane, dodecane diamine, 1,2-diamino cyclohexane, 1,4-diamino cyclohexane, para-phenylene dianine, 3-methyl piperidene, isophorone diamine, bis-hexamethylene triamine, diethylene triamine, polyfunctional amines containing adducts of ethylene and propylene oxide, such as the JEFFAMINE products of Huntsman Chemical Company.

The star polymer is made by free radical solution polymerization, followed by a solvent replacement to form a colloid composition. This colloidal composition can then be used as a stabilizer in the preparation of emulsion polymers.

The colloidal composition of the present invention can be used in place of surfactants typically used to manufacture emulsions. The present invention also provides a means of producing an emulsion polymer using the novel colloidal composition of the invention as a replacement for surfactants. The colloid can be used in the same manner, and at the same concentrations typical of surfactant use. A preferred usage would be from 5 to 20 parts per hundred monomer. Emulsion polymers containing monomers having any reactive moiety are especially preferred, since these provide potential sites for reaction with the colloidal composition, though a monomer containing a reactive group is not needed, since the reactive star polymer colloid can intertwine and tangle any polymer chains prior to crosslinlking with itself or onto another colloid particle, creating entanglements which result in improved physical properties. Emulsion polymers containing acrylic and vinyl monomers are especially preferred. A wet adhesion monomer may optionally be present in either the star polymer or emulsion polymer.

Although the solids content and viscosity of the emulsion can vary, typical total solids content which is defined as the nonvolatile components of the emulsion is preferably in the range of from about 40 to about 70 weight percent, more preferably from about 50 to about 60 weight percent, based on the total weight of the emulsion.

Coating compositions of the present invention are those containing an emulsion polymer made with the colloid composition described herein. The one-part coating compositions of the present invention are prepared as aqueous compositions which are curable to form a film. Preferably the coating composition is free of surfactants, using only the colloid composition of the invention to stabilize the emulsion.

The coating composition may additionally contain other additives which include pigments such as titanium oxide, extenders such as flour, i.e., walnut shell flour, dispersing agents, defoaming agents, anti-freezing agents, preservatives, surfactants, sequestering agents, coalescing agents, defoaming agents, humectants, thickeners, defoamers, colorants, waxes, bactericides, fungicides, and fillers such as cellulose or glass fibers, clay, kaolin, talc, calcium carbonate and wood meal, and odor-modifying agents.

In preparing the coating composition of this invention, the emulsion polymer is mixed with the additive(s). The additive(s) may be added during the polymerization, or after the polymerization. Coatings produced in this manner include high-gloss, semi-gloss and low odor paints, and pressure sensitive adhesives.

The coating composition may be applied to a wide variety of materials such as, for example, wood, cement, concrete, leather, nonwoven or woven fabrics, aluminum or other metals, glass, ceramics, glazed or unglazed, tiles, polyvinyl chloride and polyethylene terephthalate and other plastics, plaster, stucco, roofing substrates such as asphaltic coatings, roofing felts, synthetic polymer membranes, and foamed polyurethane insulation. In addition, the coating compositions may be applied to previously painted, primed, undercoated, worn, or weathered substrates.

The following nonlimiting examples illustrate further aspects of the invention.

EXAMPLE 1

A random star polymer was prepared according to the following formula:

| Ingredients | Concentration in pphm |
|---|---|
| Isopropyl Alcohol | 100 |
| Monomer Mixture | |
| Vinyltriisopropoxysilane | 3 |
| Methacrylic Acid (MAA) | 7 |
| Methyl Methacrylate (MMA) | 90 |
| Pentaerythritol tetrakis (3-mercaptopropionate) | 6.5 |
| Catalyst | |
| Azobisisobutyronitrile | 0.5 |

-continued

| Ingredients | Concentration in pphm |
|---|---|
| pH Buffer | |
| Ammonium Hydroxide | 6 |
| Water | 300 |

A four-necked one liter round-bottomed flask was equipped with a reflux condenser, a thermometer, a nitrogen inlet, addition funnels, and stirrer. The monomer mixture was added to the reactor with agitation of 100 rpm. The reactor was heated to 75° C. while stirring under atmospheric nitrogen. The catalyst was added to the reaction vessel and the reactants were polymerized for 2 hours under reflux (83° C.). The reaction was cooled and aqueous ammonium hydroxide was added and stirred for 30 minutes. After that, the isopropyl alcohol was removed and water was added to make a stable colloid. The end polymer pH was adjusted to 9.5 using aqueous ammonium hydroxide. The physical properties of the polymer are summarized in Table I.

EXAMPLE 2

A random star polymer was prepared using the procedure and formula according to Example 1, except that 5.0 pphm of vinyltriisopropoxysilane was added to the monomer mixture instead of 3 pphm of vinyltriisopropoxysilane and 88 pphm of MMA was used instead of 90 pphm of MMA. The physical properties of the polymer are summarized in Table I.

EXAMPLE 3

A random star polymer was prepared using the procedure and formula according to Example 1, except that 12 pphm of Norsocryl 102 (a mixture of 25% active of 2-(2-Oxo Imidazolidin-1-yl)ethyl methacrylate and 75% of methyl methacrylate available from Elf-Atochem) and 78 pphm of MMA was added instead of 90 pphm of MMA. The physical properties of the polymer are summarized in Table I.

EXAMPLE 4

A random star polymer was prepared using the procedure and formula according to Example 1, except that 10 pphm of vinyltriisopropoxysilane was added to the monomer mixture instead of 3 pphm of vinyltriisopropoxysilane. Also, of 54 pphm of MMA and 29 pphm of butyl acrylate (BA) was used instead of 90 pphm of MMA. The physical properties of the polymer are summarized in Table I.

EXAMPLE 5

Comparative

A linear polymer was prepared using the procedure and formula according to Example 1, except that 13 pphm of n-dodecyl mercaptan was added to the monomer mixture instead of 6.5 pphm of pentaerythritol tetrakis (3-mercaptopropionate). The physical properties of the polymer are summarized in Table I.

EXAMPLE 6

Comparative

A random star polymer was prepared using the procedure and formula according to Example 1, except that 3.0 pphm of γ-Methacryloxypropyltrimethoxysilane was added to the monomer mixture instead of 3.0 pphm of vinyltriisopropoxysilane. However, the polymer gelled during the reaction and it was unusable as a colloid.

EXAMPLE 7

Comparative

A linear polymer was prepared using the procedure and formula according to Example 5, except that 3.0 pphm of γ-Methacryloxypropyltrimethoxysilane was added to the monomer mixture instead of 3.0 pphm of vinyltriisopropoxysilane. The physical properties of the polymer are summarized in Table I.

EXAMPLE 8

A heteroarm star polymer was prepared by stage polymerization using pentaerythritol tetrakis(3-mercaptopropionate). A monomer blend of 5 pphm vinyltriisoproxysilane, 5 pphm of butyl acrylate, 40 pphm of butyl methacrylate and 2.5 pphm of pentaerythritol tetrakis (3-menrcaptopropionate) was polymerized for 45 minutes with 0.5 pphm AIBN as catalyst. A second monomer mixture of 5 pphm of butyl acrylate, 5 pphm of vinyltriisopropoxysilane and 40 pphm of acrylic acid was then added to the reaction and the polymerization continued for 2 additional hours. The reaction was cooled and aqueous ammonium hydroxide was added and stirred for 30 minutes. After that, the isopropyl alcohol was removed and water was added to make a stable colloid. The end polymer pH was adjusted to 9.5 using aqueous ammonium hydroxide. The physical properties of the polymer are summarized in Table I.

EXAMPLE 9

A random star polymer was prepared using the procedure and formula according to Example 4, except that 13 pphm of pentaerythritol tetrakis(3-mercaptopropionate) was used instead of 6.5 parts. The physical properties of the polymer are summarized in Table I.

TABLE I

Physical Properties of polymers Prepared in Examples 1–9.

| Polymer Prepared In Ex. | % Solids | Viscosity (cps)$^a$ | Particle Size (nm)$^b$ | Surface Tension (dyn/cm) | Molecular Weight (theory) |
|---|---|---|---|---|---|
| Example 1 | 14.0 | 25 | 104 | 38 | 30000$^c$ |
| Example 2 | 16.6 | 27 | 33 | 40 | 30000$^c$ |
| Example 3 | 23 | | | 35.5 | 30000 |
| Example 4 | 14.4 | 28 | 23 | 35 | 30000$^c$ |
| Example 5 | 25.5 | 1800 | 39 | | N/A |
| Example 7 | 24.6 | 2000 | 31 | | N/A |
| Example 8 | 14.0 | 56 | 39 | 39 | 78000$^c$ |
| Example 9 | 21.4 | 25 | 33 | | 15000$^c$ |

$^a$Viscosity was measured by using Brookfield Viscometer
$^b$Particle size was measured using BI-90 Particle Sizer.
$^c$Mw = (grams of monomer/moles of chain transfer agent)*4

EXAMPLE 10

Preparation of Emulsion Polymer

An aqueous emulsion polymer was prepared according to the following formula:

| Ingredients | Grams | Concentration in pphm |
|---|---|---|
| Initial water | 174 | 34.8 |
| Monomer Mixture | | |
| Water | 151 | 30.2 |
| Polymer prepared in Example 1 | 250.6 | 7.0 |
| Butyl Acrylate (BA) | 250 | 50.0 |
| Methyl Methacrylate | 250 | 50.0 |
| Catalyst Solution | | |
| Water | 51 | 10.2 |
| Ammonium Persulfate | 1.3 | 0.26 |

In a three liter vessel, equipped with a reflux condenser, addition funnels, and stirrer, the initial charge was added to the reactor with agitation of 100 rpm. The reactor was heated to 78° C. The monomer mixture was metered into the reaction over a period of four hours. During the same four hour period, the catalyst solution was slow added to the reactor over a period of four hours. The reaction was held for 30 minutes at 78° C. Then 0.6 grams of tertiary butyl hydroperoxide in 5 grams water and 0.3 grams sodium formnaldehyde sulfoxylate were added to the reactor. The pH of the emulsion polymer was adjusted to 8.5 by the addition of 26.6% aqueous ammonium hydroxide solution. The physical properties of the emulsion polymer are summarized in Table II.

EXAMPLE 11

An emulsion polymer was prepared using the procedure and formula according to Example 10, except that 7.0 pphm of the polymer prepared in Example 2 was added to the monomer mixture instead of 7.0 pphm of the Polymer prepared in Example 1. The physical properties of the emulsion polymer are summarized in Table II.

EXAMPLE 12

An emulsion polymer was prepared using the procedure and formula according to Example 10, except that 7.0 pphm of the polymer prepared in Example 4 was added to the monomer mixture instead of 7.0 pphm of the polymer prepared in Example 1. The physical properties of the emulsion polymer are summarized in Table II.

EXAMPLE 13

Comparative

An emulsion polymer was prepared using the procedure and formula according to Example 10, except that 7.0 pphm of the polymer prepared in Example 7 was added to the monomer mixture instead of 7.0 pphm of the polymer prepared in Example 1. The physical properties of the emulsion polymer are summarized in Table II.

EXAMPLE 14

Comparative

An emulsion polymer was prepared using the procedure and formula according to Example 10, except that 7.0 pphm of the polymer prepared in Example 5 was added to the monomer mixture instead of 7.0 pphm of the polymer prepared in Example 1. The physical properties of the emulsion polymer are summarized in Table II.

TABLE II

Physical Properties of Emulsion Polymers Prepared in Examples 10–14.

| Polymer Prepared In Ex. | % Solid | Viscosity (cps) | Particle Size (nm) | MFFT[a] (° C.) | Tg[b] (° C.) |
|---|---|---|---|---|---|
| Example 10 | 48.73 | 178 | 131 | 7.2 | 20.7 |
| Example 11 | 49.86 | 1848 | 103 | 8.3 | 17 |
| Example 12 | 49.74 | 660 | 117 | 7.4 | 16.6 |
| Example 13 | 48.42 | 1240 | 112 | 7.0 | 14.9 |
| Example 14 | 48.53 | 790 | 114 | 7.0 | 18.5 |

[a]MFFT is the minimum film formation temperature.
[b]Tg is the glass transition temperature.

EXAMPLE 15

Preparation of High Gloss Paint

The emulsion polymers prepared in Examples 10–14 were evaluated in a High-gloss paint formula at 18.8% pigment volume concentration (PVC).

| Grind | Grams |
|---|---|
| WATER | 40.0 |
| PROPYLENE GLYCOL | 80.0 |
| TAMOL 731 | 8.2 |
| BYK - 022 | 1.0 |
| KRONOS 2310 | 207.1 |
| ACRYSOL RM-830 | 10.0 |
| Letdown | |
| WATER | 60.0 |
| BUTYL CARBITOL | 13.0 |
| TEXANOL | 19.3 |
| TRITON X-405 | 1.2 |
| Emulsion Polymer (50%) | 538 |
| ACRYSOL RM-2020 | 14.9 |
| BYK - 022 | 1.0 |
| AMMONIUM HYDROXIDE | 0.9 |
| KATHON LX 1.5% | 0.5 |
| LAMP BLACK | 0.2 |
| Total | 1027.941 |

BYK-022 is a defoamer available from BYK Chemie.
KRONOS 2310 is a titanium dioxide pigment available from Kronos.
KATHON LX is a preservative available from Rohm & Haas.
ACRYSOL RM 2020 is a thickener available from Rohm & Haas.
ACRYSOL RM 830 is a thickener available from Rohm & Haas.
TRITON X-405 is nonionic surfactant, octyl phenol with 40 moles of EO
TEXANOL is an ester alcohol coalescing agent.
PROPYLENE GLYCOL is an anti-freeze additive
BUTYL CARBITOL is a solvent
LAMP BLACK is a tinter available from Huls In a high speed dispersator, the Grind was dispersed. The Letdown was added to the dispersion and mixed for 15 minutes. The paints were evaluated in scrub resistance (ASTM D 2486).

Table III shows the results of High-gloss paints formulated with the polymer of the Examples 10–14 compared to commercially available polymer. The results showed that emulsion polymers (Example 10–12) stabilized by the inventive star polymer when formulated in High-Gloss Paint exhibit significant improvement in abrasion resistance than that of emulsion polymers stabilized by linear polymer, and far better than the commercially available UCAR 481.

TABLE III

Performance Properties of Emulsion Polymers in High Gloss Paint formulations

| High-Gloss Paints for Polymers prepared in | Scrub resistance (cycles) |
|---|---|
| Polymer of Example 10 | 5150 |
| Polymer of Example 11 | 6800 |
| Polymer of Example 12 | 9000 |
| Polymer of Example 13 | 2400 |
| Polymer of Example 14 | 2400 |
| UCAR 481 | 250 |

EXAMPLE 16

An emulsion polymer was prepared using the procedure and formula according to Example 11, except that 1 pphm of vinyltriisopropoxysilane was added to the monomer mixture. In addition, 1 pphm (100% active) of Norsocryl 102 was added to the monomer mixture. Norsocryl 102 is a mixture of 25% active of 2-(2-Oxo-1-imidazolidinyl)ethyl methacrylate and 75% of methyl methacrylate available from Elf-Atochem. The physical properties of the emulsion polymer are summarized in Table IV.

EXAMPLE 17

Comparative

An emulsion polymer was prepared using the procedure and formula according to Example 14 except that 1 pphm of vinyltriisopropoxysilane was added to the monomer mixture. In addition, 1 pphm (100% active) of Norsocryl 102 was added to the monomer mixture. Norsocryl 102 is a mixture of 25% active of 2-(2-Oxo-1-imidazolidinyl)ethyl methacrylate and 75% of methyl methacrylate available from Elf-Atochem. The physical properties of the emulsion polymer are summarized in Table IV.

TABLE IV

Physical Properties of Emulsion Polymers Prepared in Examples 16 and 17.

| Polymer Prepared In Ex. | % Solid | Viscosity (cps) | Particle Size (nm) | MFFT (° C.) | Tg (° C.) |
|---|---|---|---|---|---|
| Example 16 | 48.25 | 110 | 141 | 7.5 | 18.2 |
| Example 17 | 48.1 | 116 | 141 | 7.5 | 18.3 |

EXAMPLE 18

The emulsion polymers prepared in Examples 16 and 17 were evaluated in a High-Gloss Paint Formula at 18.8% pigment volume concentration (PVC) according to Example 15. The paints were evaluated in relation to their 20° and 60° gloss (ASTM D 523-80), scrub resistance (ASTM D 2486), and wet adhesion.

Wet Adhesion was determined as follows:

Scrub panels were prepared by drawing down a 3 mil film of a semi-gloss alkyd base (chosen as being the most difficult test for the wet adhesion) onto a leneta chart. The charts were aged at least one month at room temperature. The test latex paints were then drawn down into a 3 ml film onto the aged alkyd surface and allowed to dry for 48 hours. The dried charts were affixed to glass panels and put into the scrub machine equipped with a scrub brush and a basin for holding the panel. The brush was conditioned by immersing it in warm water for 30 minutes and then placed in the machine hold. The test panel was placed in the basin under the brush and 200 grams of warm water (50° C.) were added to the basin. The scrub machine was started and run for 200 cycles. If the coating remained intact, 8 grams of a dry abrasive (Ajax) were placed under the brush and the machine run for 50 cycles. The last step was repeated until the coating failed, that is, when the test paint stripped from the alkyd base. The number of cycles to failure was recorded.

TABLE V

Performance Properties of Emulsion Polymers in High-Gloss Paint Formulations

| High-Gloss Paints | Polymer of Example 16 | Polymer of Example 17 |
|---|---|---|
| Gloss (20/60°) 7 days dry | 35.7/75.2 | 47.1/80.5 |
| Scrub resistance (cycles) | 5600 | 1525 |
| Wet adhesion (cycles) | 3000 | 1800 |

The test results are summarized in Table V. The results showed that emulsion polymer (Example 16) stabilized by the inventive star polymer when formulated in High-Gloss Paint exhibited significant improvement in abrasion resistance and wet adhesion than that of emulsion polymer stabilized by linear polymer (Example 17).

EXAMPLE 19

An emulsion polymer was prepared using the procedure and formula according to Example 10, except that 7.0 pphm of the polymer prepared in Example 9 was added to the monomer mixture instead of 7.0 pphm of the polymer prepared in Example 1. In addition, 1 pphm of vinyltriisopropoxysilane and 1 pphm (100% active) of Norsocryl 102 were added to the monomer mixture. Norsocryl 102 is a mixture of 25% active of 2-(2-Oxo Imidazolidin-1-yl)ethyl methacrylate and 75% of methyl methacrylate available from Elf-Atochem. This emulsion polymer had 50.5% solids, particle size of 133 nm and pH of 8.5.

EXAMPLE 20

Preparation of Semi-Gloss Paint

The emulsion polymers prepared in Examples 16, 17 and 19 were evaluated in a semi-gloss paint formula at 25.1% pigment volume concentration (PVC). The test results are summarized in Table VI.

| Grind | Grams |
|---|---|
| Water | 60.0 |
| Propylene glycol | 60.0 |
| BYK - 156 | 5.0 |
| Triton CF-10 | 2.5 |
| BYK - 305 | 2.5 |
| KRONOS 2020 | 290.0 |
| ASP 170 | 48.0 |

-continued

| Grind | Grams |
|---|---|
| Letdown | |
| Water | 114.0 |
| Texan | 32.0 |
| Emulsion Polymer (50%) | 635.0 |
| Acrysol RAM-825 | 0.8 |
| Acrysol RM-1020 | 22.0 |
| AMP-95 | 2.0 |
| Water | 15.0 |
| BYK - 035 | 2.5 |
| KATHON LX 1.5% | 0.5 |
| Total | 1296.3 |

BYK - 156 is a acrylic copolymer available from BYK Chemie.
BYK - 035 is a defoamer available from BYK Chemie.
KRONOS 2020 is a titanium dioxide pigment available Kronos.
ASP-170 is an aluminum silicate extender pigment.
ACRYSOL RM 1020 is a thickener available from Rohm & Haas.
ACRYSOL RM 825 is a thickener available from Rohm & Haas.
TRITON CF-10 is a nonionic surfactant, Alkylaryl polyether
TEXANOL is an ester alcohol coalescing agent.
PROPYLENE GLYCOL is an anti-freeze additive
KATHON LX is a preservative available from Rohm & Haas.

In a high speed dispersator, the Grind was dispersed. The Letdown was added to the dispersion and mixed for 15 minutes. The paints were evaluated in relation to their 20° and 60° gloss (ASTM D 523-80), scrub resistance (ASTM D 2486), and wet adhesion as described in Example 19.

TABLE VI

Performance Properties of Emulsion Polymers in Semi-Gloss Paint Formulations

| Solvent-Free Semi-Gloss Paint | Polymer of Example 16 | Polymer of Example 17 | Polymer Example 19 |
|---|---|---|---|
| Gloss (20/60°) 7 days dry | 8.7/46.1 | 7.0/40.3 | 7.0/42.9 |
| Scrub resistance (cycles) | 2950 | 700 | 3000 |
| Wet adhesion (cycles) | 3200 | 3200 | 5200 |

The results in Table VI showed that emulsion polymers prepared in Example 16 and Example 19, stabilized by the inventive star polymers, when formulated in Semi-Gloss Paint exhibit significant improvement in abrasion resistance and in wet adhesion over that of emulsion polymer stabilized by linear polymer (Example 17).

EXAMPLE 21

An emulsion polymer was prepared using the procedure and formula according to Example 10, except that 7.0 pphm of the polymer prepared in Example 9 was added to the monomer mixture instead of 7.0 pphm of the polymer prepared in Example 1. Also, the monomer mixture contains of 62 pphm of butyl acrylate and 38 pphm of methyl methacrylate instead of 50 BA and 50 MMA. In addition, 1 pphm of vinyltriisopropoxysilane was added to the monomer mixture This emulsion polymer has 50.3% solids, particle size of 153 nm and pH of 8.5.

EXAMPLE 22

Comparative

An emulsion polymer was prepared using the procedure and formula according to Example 10, except that 7.0 pphm of the polymer prepared in Example 5 was added to the monomer mixture instead of 7.0 pphm of the polymer prepared in Example 1. Also, the monomer mixture contains of 62 pphm of butyl acrylate and 38 pphm of methyl methacrylate instead of 50 BA and 50 MMA. In addition, 1 pphm of vinyltriisopropoxysilane was added to the monomer mixture. This emulsion polymer has 49.14% solids, particle size of 150 nm and pH of 8.3.

EXAMPLE 23

Preparation of Solvent-Free Semi-Gloss Paint

The emulsion polymers prepared in Example 21 and Example 22 were evaluated in a solvent free semi-gloss paint formula at 25.1% pigment volume concentration (PVC). The test results are summarized in Table VII.

| Grind | Grams |
|---|---|
| Water | 210.0 |
| BYK-156 | 5.0 |
| BYK-301 | 4.0 |
| BYK-034 | 2.0 |
| Natrosol 250 HR | 1.0 |
| Caustic Potash (45%) | 4.0 |
| KRONOS 2020 | 300.0 |
| ASP 170 | 50.0 |
| Polyphobe 102 | 6.3 |
| BYK-034 | 0.6 |
| Letdown | |
| Water | 140.6 |
| Rexol 45/407 | 4.0 |
| Emulsion Polymer (50%) | 654.6 |
| Polyphobe 102 | 8.5 |
| BYK-034 | 0.8 |
| KATHON LX 1.5% | 0.6 |
| Total | 1392.0 |

BYK-156 is a acrylic copolymer available from BYK Chemie.
BYK-034 is a defoamer available from BYK Chemie.
KRONOS 2020 is a titanium dioxide pigment available Kronos.
ASP-170 is an aluminum silicate extender pigment.
Polyphobe 102 is a thickener available from Union Carbide.
Natrosol 250 HR is Hydroxy ethyl cellulose.
Rexol 45/407 is a nonionic surfactant, octyl phenol ethoxylated
KATHON LX is a preservative available from Rohm & Haas.

In a high-speed dispersator, the Grind was dispersed. The Letdown was added to the dispersion and mixed for 15 minutes. The paints were evaluated in relation to their 20° and 60° gloss (ASTM D 523-80), scrub resistance (ASTM D 2486) as described in Example 18.

TABLE VII

Performance Properties of Emulsion Polymers in Solvent-Free Semi-Gloss Paint Formulation

| Solvent-Free Semi-Gloss Paint | Polymer of Example 21 | Polymer of Example 22 |
|---|---|---|
| Gloss (20/60°) | 13.6/54.1 | 13.0/53.6 |
| 7 days dry | | |
| Scrub resistance (cycles) | 3800 | 550 |
| Wet adhesion (cycles) | 3200 | 2400 |

The results in Table VII showed that emulsion polymer prepared in Example 21 which is stabilized by the inventive star polymers, when formulated in solvent-free semi-gloss paint exhibits significant improvement in abrasion resistance and in wet adhesion over that of emulsion polymer stabilized by linear polymer (Example 22).

EXAMPLE 24

Water Blushing Test

The emulsion polymer prepared in Example 11 was drawn down on a glass plate using a 3-mil bird applicator. The film was then dried in the 50° C. oven overnight. The film was then soaked in a basin of water for 48 hours. The film showed no sign of visible haze or milkiness. The emulsion polymer stabilized by the inventive star polymer showed excellent water resistance.

EXAMPLE 25

Stain and Chemical Resistance

The emulsion polymer prepared in Example 11 was formulated with 15% (solids on solids) Butyl Cellosolve (ethylene glycol butyl ether). This sample was drawn down on a glass plate using a 3-mil bird applicator. The film was then dried in the 50° C. oven overnight. The film was tested for stain resistance from ketchup, mustard, grape juice, KOOL-AID and coffee after one hour exposure. The film was also tested for chemical resistance from de-ionized water, 10% Sodium Hydroxide, 10% Sodium Chloride, 3% Trisodium Phosphate, 10% Ammonia, 10% Hydrochloric and 100% Isopropanol for 1 hour with no exposure to the air. The test results are summarized in Table VIII and Table IX.

TABLE VIII

Performance Properties of Emulsion Polymer in Stain Resistance Test

| Polymer prepared in Example 11 | Stain Resistance Test |
|---|---|
| Ketchup | Excellent (no effect) |
| Mustard | Excellent (no effect) |
| "Kool-Aid" | Excellent (no effect) |
| Grape juice | Excellent (no effect) |
| Coffee | Excellent (no effect) |

TABLE IX

Performance Properties of Emulsion Polymer in Chemical Resistance Test

| Polymer prepared in Example 11 | Stain Resistance Test |
|---|---|
| De-ionized water | Excellent (no effect) |
| 10% Sodium Hydroxide | Excellent (no effect) |
| 10% Sodium Chloride | Excellent (no effect) |
| 3% Sodium Phosphate | Excellent (no effect) |
| 10% Ammonia | Very slightly hazy |
| 10% Hydrochloric acid | Very slight hazy |
| 100% Isopropanol | Excellent (no effect) |

EXAMPLE 26

Water Blushing Test

The emulsion polymer prepared in example 12 was drawn down on a blue jeans fabric using a 3-mil bird applicator.

The film was then dried in the 50° C. oven overnight. The film was found to be very glossy and flexible. The film was then soaked in a basin of water for 72 hours. The film showed no sign of visible haze or milkiness. The film also showed no sign of poor adhesion. The emulsion polymer stabilized by the inventive star polymer showed excellent water resistance.

EXAMPLE 27

The emulsion polymer prepared in example 12 was drawn down on a brown ceramic tile substrate using a 3-mil bird applicator. The film was then dried in the 50° C. oven overnight. One gram of water was dropped on the film for 4 hours. The film was then wiped with paper towel. The film showed no sign of visible haze or milkiness. The emulsion polymer stabilized by the inventive star polymer showed excellent water resistance.

EXAMPLE 28

The elongation test was performed on the emulsion polymer prepared in example 11 according to ISO R527A with an Instron 4301 dynamometer (100 Newton). The rate of elongation is 250 mm/minute and the elongation is followed with optical extensometer. The films of emulsion polymer prepared in example 11 were tested after 7 days drying and after 7 days drying followed by 22 hours of immersion in water. It was found that the emulsion polymer of example 11 has no change in elongation before and after the film was immersed in water for 22 hours. The emulsion polymer stabilized by the inventive star polymer showed excellent water resistance.

While the invention has been described with particular reference to certain embodiments thereof, it will be understood that changes and modifications may be made by those of ordinary skill within the scope and spirit of the following claims.

What is claimed is:

1. A colloid composition comprising a heteroarm amphiphilic star polymer having potentially crosslinkable sites on the polymer backbone, wherein the potentially crosslinkable site is a starically hindered silane unit wherein the star polymer also contains an internal catalyst.

2. The colloid composition of claim 1 wherein said amphiphilic star polymer is a random star polymer.

3. The colloid composition of claim 1 wherein said star polymer has a molecular weight in the range of from 10,000 to 100,000.

4. The colloid composition of claim 3 wherein said star polymer has a molecular weight in the range of from 15,000 to 75,000.

5. The colloid composition of claim 4 wherein said star polymer has a molecular weight in the range of from 30,000 to 50,000.

6. The colloid composition according to claim 2 wherein the star polymer has at least one arm with a $T_g$ of at least about 20° C.

7. The colloid composition according to claim 1 wherein the sterically hindered silane monomer is vinyltriisopropoxy silane.

8. The colloid composition of claim 1 comprising 1 to 20 pphm sterically hindered silane monomer.

9. The colloid composition of claim 1 wherein said internal catalyst is an ethylenically unsaturated carboxy-functional monomer.

10. The colloid composition of claim 1 comprising 0.1 to 10 pphm of said internal catalyst.

11. An emulsion composition comprising a colloid composition comprising an amphiphilic star polymer having potentially crosslinkable sites on the polymer backbone, wherein the potentially crosslinkable site is a sterically hindered silane unit wherein the star polymer also contains an internal catalyst, and an emulsion polymer.

12. The emulsion composition of claim 11 comprising 5 to 20 pphm of said colloid composition.

13. The emulsion composition of claim 11 wherein said emulsion polymer comprises a polymer formed from at least one ethylenically unsaturated monomer having a reactive moiety.

14. The emulsion composition of claim 13 wherein said monomer comprises an acrylic monomer, a vinyl monomer, or a mixture thereof.

15. The emulsion composition of claim 11 being surfactant-free.

16. The emulsion composition of claim 11 further comprising a wet adhesion monomer as a part of either the star polymer or the emulsion polymer.

17. A one-part coating composition comprising the emulsion composition of claim 11.

* * * * *